US006816243B2

(12) United States Patent
Shurgalin et al.

(10) Patent No.: US 6,816,243 B2
(45) Date of Patent: Nov. 9, 2004

(54) OPTICAL WAVEGUIDE MONITORING

(75) Inventors: Max Shurgalin, Arlington, MA (US); Yoel Fink, Cambridge, MA (US); Steven G. Johnson, Cambridge, MA (US); Mihai Ibanescu, Cambridge, MA (US)

(73) Assignee: OmniGuide Communications, Cambridge, MA (US)

( * ) Notice: Subject to any disclaimer, the term of this patent is extended or adjusted under 35 U.S.C. 154(b) by 117 days.

(21) Appl. No.: 10/090,903

(22) Filed: Mar. 5, 2002

(65) Prior Publication Data

US 2002/0171823 A1 Nov. 21, 2002

Related U.S. Application Data

(60) Provisional application No. 60/273,596, filed on Mar. 5, 2001.

(51) Int. Cl.$^7$ .............................................. G01N 21/00
(52) U.S. Cl. ...................................................... 356/73.1
(58) Field of Search ................. 356/73.1; 250/205–216, 250/227.14, 227.18; 385/1–10, 100–114, 122–128

(56) References Cited

U.S. PATENT DOCUMENTS

| | | | |
|---|---|---|---|
| 3,982,816 | A | 9/1976 | Watkins |
| 4,067,651 | A | 1/1978 | Watkins |
| 4,081,258 | A | 3/1978 | Goell et al. |
| 4,236,904 | A | 12/1980 | Lazay |
| 4,583,851 | A | 4/1986 | Yataki |
| 4,678,327 | A | 7/1987 | Yoshida et al. |
| 4,705,354 | A | 11/1987 | Ulrich |
| 4,794,249 | A | 12/1988 | Beckmann et al. |
| 4,890,915 | A | 1/1990 | Byvik et al. ................... 356/73 |
| 5,185,636 | A | 2/1993 | Button et al. |
| 5,289,265 | A * | 2/1994 | Inoue et al. ................ 356/632 |
| 5,305,078 | A | 4/1994 | Lamonde |
| 5,534,994 | A | 7/1996 | Hanson et al. |
| 5,633,708 | A * | 5/1997 | Svendsen ................... 356/73.1 |
| 5,844,235 | A | 12/1998 | Tachikawa et al. |
| 6,008,487 | A | 12/1999 | Tachikawa et al. |
| 6,055,058 | A * | 4/2000 | Krahbichler et al. ......... 356/630 |

OTHER PUBLICATIONS

T. A. Birks et al., "Full 2–D photonic bandgaps in silica/air structure," Electronics Letters, vol. 31, No. 22, pp. 1941–1943, Oct. 26, 1995.
Y. Fink et al., "Guiding optical light in air using an all–dielectric structure," Journal of Lightwave Technology, vol. 17, No. 11, pp. 2039–2041, Nov. 1999.
Stig E. Barkou et al., "Silica–air photonic crystal fiber design that permits waveguiding by a true photonic bandgap effect," Optics Letters, vol. 24, No. 1, pp. 46–48, Jan. 1, 1999.
J. C. Knight et al., "Photonic band gap guidance in optical fibers," Science, vol. 282, pp. 1476–1478, Nov. 20, 1998.
2001 OmniGuide Long–Haul Fiber, OmniGuide Communications Inc., Cambridge, MA.
P. Yeh et al., "Theory of Bragg fiber", J. Opt. Soc. Am., vol. 68, pp. 1196, 1978.
Abushagaur M.A. G. et al., Applied Optics, vol. 19, pp. 2031, 1980.
C. Martijn de Sterke et al., "Differential losses in Bragg fibers," J. Appln. Phys., 76 (2), pp. 680–688, Jul. 15, 1994.
Steven G. Johnson et al., "Low–loss effectively single–mode propagation in large–core OmniGuide fibers".
J. C. Knight, e t al., "Properties of photonic crystal fiber and the effective index model", J. Opt. Soc. Am. A, 15 (3): 748–752 (1998).
R. F. Cregan, et al., "Single–mode photonic band gap guidance of light in air", Science, 285: 1537–1539 (1999).

* cited by examiner

*Primary Examiner*—Tu T. Nguyen
(74) *Attorney, Agent, or Firm*—Fish & Richardson P.C.

(57) ABSTRACT

Techniques for monitoring optical waveguides are disclosed.

48 Claims, 14 Drawing Sheets

OPTICAL WAVEGUIDE MONITORING

CROSS-REFERENCE TO RELATED APPLICATIONS

This application claims priority to U.S. Provisional Patent Application Ser. No. 60/273,596, filed Mar. 5, 2001, the contents of which are incorporated herein by reference.

TECHNICAL FIELD

This invention relates to optical waveguides, and more particularly to monitoring optical waveguides.

BACKGROUND

Optical waveguides guide optical signals to propagate along a preferred path or paths. Accordingly, they can be used to carry optical signal information between different locations and thus they form the basis of optical telecommunication networks. The most prevalent type of optical waveguide is an optical fiber based on index guiding. Such fibers include a core region extending along a waveguide axis and a cladding region surrounding the core about the waveguide axis and having a refractive index less than that of the core region. Because of the index-contrast, optical rays propagating substantially along the waveguide axis in the higher-index core can undergo total internal reflection (TIR) from the core-cladding interface. As a result, the optical fiber guides one or more modes of electromagnetic (EM) radiation to propagate in the core along the waveguide axis. The number of such guided modes increases with core diameter. Notably, the index-guiding mechanism precludes the presence of any cladding modes lying below the lowest-frequency guided mode. Almost all index-guided optical fibers in use commercially are silica-based in which one or both of the core and cladding are doped with impurities to produce the index contrast and generate the core-cladding interface. For example, commonly used silica optical fibers have indices of about 1.45 and index contrasts of up to about 2–3% for wavelengths in the range of 1.5 microns.

Another type of waveguide fiber, one that is not based on TIR index-guiding, is a Bragg fiber, which includes multiple dielectric layers surrounding a core about a waveguide axis. The multiple layers form a cylindrical mirror that confines light to the core over a range of frequencies. The multiple layers form what is known as a photonic crystal, and the Bragg fiber is an example of a photonic crystal fiber.

An important characteristic of an optical waveguide is the transmission loss, or attenuation, of the waveguide. Transmission loss can be described as a logarithmic relationship between the optical output power and the optical input power in a waveguide system. It is a measure of the decay of signal strength, or loss of light power, that occurs as light pulses propagate through the length of a waveguide. Transmission loss can be caused by several intrinsic and extrinsic factors. In optical fibers, for example, intrinsic factors include scattering and absorption. Extrinsic causes of attenuation include cable-manufacturing stresses, environmental effects, and physical bends in the fiber.

In optical fibers the primary mechanism for transmission loss is Rayleigh scattering in the solid fiber core. Any structural and physical defect, such as voids in the core and/or cladding, or fiber eccentricity, significantly enhance light scattering and/or increase the fiber transmission loss. In addition to the increased transmission loss, structural flaws in the fiber can also lead to reduced mechanical strength and consequently a higher probability of fiber failure in the field. Therefore, it is important to detect the presence of defects in the fiber during the fiber manufacturing process. A number of methods have been developed to monitor the quality of the fiber in real time during fiber drawing.

One such method involves measuring the diameter of an optical fiber and detecting the presence of holes or voids in the fiber. The fiber is transversely illuminated with monochromatic light and an interference pattern is produced in the far field due to the superposition of light reflected from the fiber surface and light refracted through the fiber. The interference fringe pattern depends on the fiber core and cladding diameters and their respective refractive indexes. The number of interference fringes is related to the fiber diameter. However, the presence of a hole results in missing fringes. Thus changes in the interference pattern can be used to detect holes in the fiber.

Another method, utilizing the far field interference pattern created by illuminating an optical fiber with monochromatic light, determines a spatial frequency spectrum from the interference pattern using a Fast Fourier transform. The spatial frequency spectrum contains a frequency component corresponding to the fiber diameter. If there are voids or holes present in the fiber, the spatial frequency spectrum will contain additional components. Detecting these additional components and observing their behavior over time enables determining the extent of the fiber defects as well as their growth with time. In addition, the total power of the interference pattern is measured, which is affected by the size of a hole. Analysis of the total power in the interference pattern together with the intensity of the components in the spatial frequency spectrum compensates for fluctuations in the light source intensity and enables determining void size.

SUMMARY

The invention features techniques for monitoring the quality (e.g., optical and mechanical properties, including the presence of defects) in optical waveguides (e.g., photonic crystal fibers). The inventors have recognized that the spectral composition of light reflected from the side (e.g., light incident on the outside of the waveguide non-parallel to the waveguide axis, such as having an angle of incidence from about −85 degrees to +85 degrees) of certain optical waveguides (e.g., photonic crystal fibers) depends on the structure and composition of the waveguide. Hence, by monitoring the spectral composition of light reflected from the side of the waveguide and comparing the measured spectrum to a reference spectrum, one can evaluate the quality of the fiber.

In a first aspect, the invention features a method for monitoring the quality of a photonic crystal fiber. The method includes directing test light toward a side of a photonic crystal fiber and detecting measurement light emerging from the photonic crystal fiber in response to the test light. The method also includes monitoring the quality of the photonic crystal fiber based on the measurement light.

Embodiments may include one or more of the following. The emerging light can include reflected light. Monitoring the quality of the photonic crystal fiber can include determining a measurement spectrum of the measurement light. The measurement spectrum can be related to the bandgap of the photonic crystal fiber. Monitoring the quality of the photonic crystal fiber further can include determining an error signal that is based on a function of the measurement spectrum. The function of the measurement spectrum can also be a function of a reference spectrum (e.g., an empirically or theoretically determined reference spectrum). The function can be related to a difference (e.g., a weighted difference) between the measurement spectrum and the reference spectrum.

The method can further include drawing a photonic crystal fiber preform into the photonic crystal fiber while the measurement light is detected. Moreover, the method can include adjusting draw parameters based on the photonic crystal fiber quality.

The photonic crystal fiber can be a Bragg fiber. The photonic crystal fiber can be designed to guide light having a wavelength between 1.2 microns and 1.7 microns, or a wavelength between 0.7 microns and 1.0 microns.

The measurement light can be detected over a range of angles. The detection of measurement light can include collecting the measurement light with light collecting optics.

Monitoring the quality of the photonic crystal fiber can include detecting structural and/or compositional defects in the photonic crystal fiber. The detection of structural and/or compositional defects is based on a spectrum of the measurement light. Monitoring the quality of the photonic crystal fiber can also include detecting differences between a measurement spectrum based on the measurement light and a reference spectrum.

Directing the test light can include directing (e.g., simultaneously directing) the test light to different regions of the photonic crystal fiber. Directing the test light can include focusing the test light onto the side of the photonic crystal fiber.

Detecting the measurement light can include detecting the measurement light emerging from the regions of the photonic crystal fiber. Detecting the measurement light can also include gathering the measurement light scattered from the side of the photonic crystal fiber. A single optical component can perform the focusing and gathering.

Monitoring the quality of the photonic crystal fiber can include determining a measurement spectrum of each region of the photonic crystal fiber based on the measurement light.

In another aspect, the invention features a method for monitoring the quality of an optical waveguide, which includes directing broadband test light to a side of an optical waveguide and detecting measurement light reflected from the optical waveguide in response to the test light. The method also includes determining the measurement light intensity at a plurality of wavelengths and monitoring the quality of the optical waveguide based on a measurement spectrum of the measurement light.

Embodiments can include one or more of the following features. Monitoring the quality of the optical waveguide can include comparing the measurement spectrum to a reference spectrum. Monitoring the quality of the optical waveguide can include detecting structural and/or compositional defects in the optical fiber.

The method can also include drawing an optical waveguide preform into the optical waveguide, wherein detecting the measurement light occurs during the drawing. The method can further include adjusting a draw parameter for the drawing based on the optical waveguide quality.

The optical waveguide can be a photonic crystal fiber (e.g., a Bragg fiber).

In a further aspect, the invention features an apparatus for monitoring a photonic crystal fiber, which includes a mount for supporting the photonic crystal fiber, an illumination system which during operation directs test light to a side of the photonic crystal fiber, and a detection system which during operation detects measurement light emerging from the photonic crystal fiber in response to the test light.

Embodiments can include one or more of the following. The apparatus can also include a controller, which during operation causes the illumination system to direct the test light and receive information based on the measurement light detected by the detection system. During operation the controller can determine a measurement light spectrum. The controller can also detect structural and/or compositional defects in the photonic crystal fiber based on the measurement light spectrum. The apparatus can also include a fiber drawing system, which during operation draws a photonic crystal fiber preform into the photonic crystal fiber. The controller can also adjust a draw parameter of the fiber drawing system based on the measurement light spectrum.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control. In addition, the apparatus, methods, and examples are illustrative only and not intended to be limiting.

Additional features, objects, and advantages of the invention will be apparent from the following detailed description and drawings, and from the claims.

DESCRIPTION OF DRAWINGS

Like reference symbols in the various drawings indicate like elements.

DETAILED DESCRIPTION

The invention features methods and apparatus for monitoring the quality in optical waveguides (e.g., photonic crystal fibers). The method is based on directing test light to the side of a waveguide (e.g., at a non-zero angle relative to the waveguide axis), and measuring the spectrum of light emerging (e.g., reflected) from the side of a waveguide in response to the test light. Measuring the spectrum includes measuring the intensity of light for a known wavelength or band of wavelengths (e.g., measuring an intensity for each wavelength or wavelength band in a range of wavelengths). Monitoring waveguide quality can include detecting structural defects (e.g., deviations in the core radius or cladding layer thickness, or the presence of air bubbles or contaminant particles) and compositional defects (e.g., variations in the refractive index of the core or cladding layers from their designed values) in the waveguide. The method can be implemented while the waveguide is being made (e.g., drawn from a waveguide preform). The structure of some optical waveguides, such as photonic crystal fibers, can exhibit reflectance spectra that are strongly dependent on their structure. For example, photonic crystal fibers exhibit photonic bandgaps (PBGs), which are wavelength bands for which the fibers reflect substantially all incident light. Hence, analysis of the reflection spectra of waveguides can provide information about the waveguide's structure. Analysis of the reflection spectra can include comparing the measured spectra to a reference spectrum, e.g., a theoretical reflection spectrum for a defect-free waveguide. Moreover, when the optical waveguide is monitored during drawing, the information about the waveguide structure can be used to control the draw parameters to adjust for any deviations from the defect-free structure.

Figure 1A:
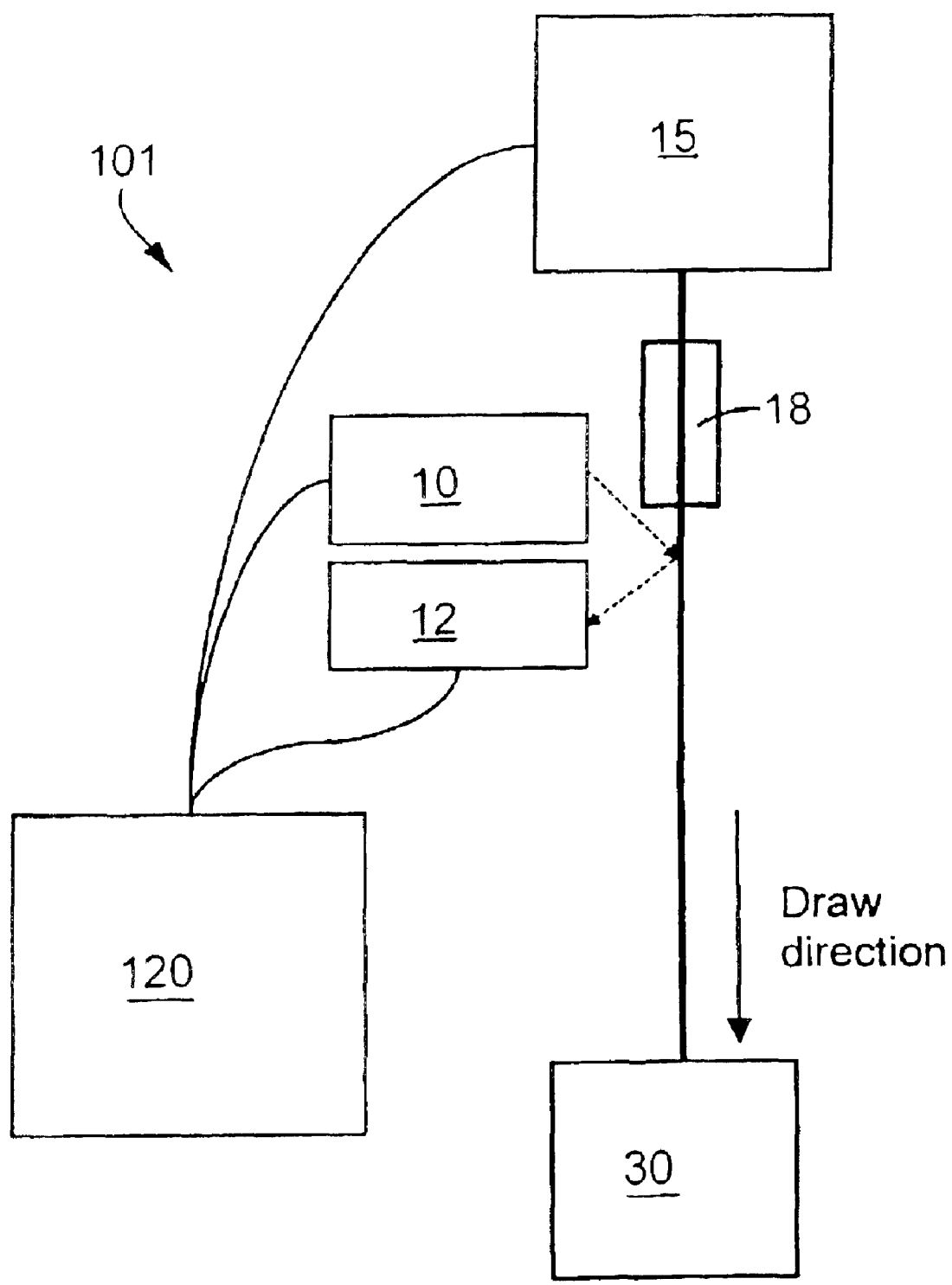
FIG. 1A is a schematic view of an embodiment of an optical waveguide monitoring system.

Referring to FIG. 1A, a photonic crystal fiber monitoring system 101 monitors a newly drawn photonic crystal fiber 20 for defects before a protective coating is applied to the fiber by a coating system 30. From a high-level perspective, photonic crystal fiber monitoring system 101 includes an illumination system 10 and a detection system 12. Both illumination system 10 and detection system 12 are in communication with a controller 120, which performs data acquisition and spectral analysis. Controller 120 is also in communication with a photonic crystal fiber drawing system 15, which draws photonic crystal fiber 20 from a photonic crystal fiber preform (not shown). A fiber mount 18 positions photonic crystal fiber 20 appropriately relative to illumination system 10 and detection system 12.

The illumination system directs test light to the side of photonic crystal fiber 20. Test light reflects from photonic crystal fiber 20, and a portion of the reflected light is detected by detection system 12. Controller 120 acquires data related to the detected measurement light from the detection system and analyzes the data to determine the quality of photonic crystal fiber 20. Based on the quality of the fiber, controller 120 optionally sends a signal to photonic crystal fiber drawing system 15 to adjust various draw parameters to correct for deviations of the fiber from the desired fiber structure. For example, if the measured spectrum indicates that the fiber is thicker than desired, controller 120 sends a signal to drawing system 15 causing drawing system 15 to decrease the fiber diameter (e.g., by changing the preform temperature and/or adjusting the drawing speed). Information from the controller can be constantly fed back to drawing system 15 to ensure the fiber is drawn to conform to predetermined specifications. Furthermore, the controller can halt the drawing process when the controller detects a defect potentially catastrophic to the fibers performance. The controller can also record the position of the defective areas in the fiber for later follow-up and offline quality control.

Figure 1B:
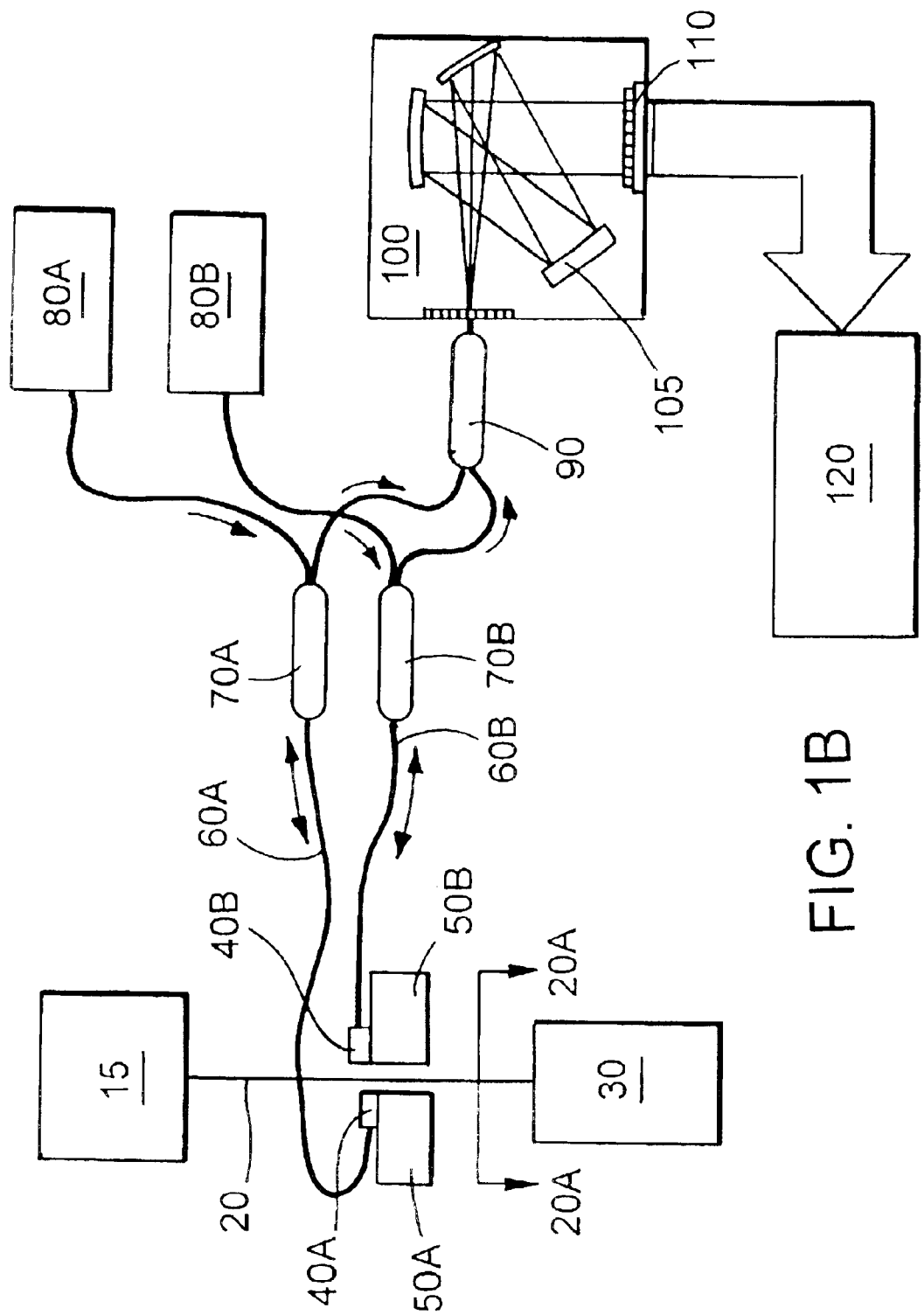
FIG. 1B is a schematic view of an embodiment of an optical waveguide monitoring system.

Referring to FIG. 1B, which shows an embodiment of a photonic crystal fiber monitoring system in more detail, the illumination system includes two light sources 80A and 80B, two optical fibers 60A and 60B, and two sets of illumination and light collection optics 40A and 40B. Optical fibers 60A and 60B guide test light from light sources 80A and 80B to illumination and light collection optics 40A and 40B, which focus test light onto the side of photonic crystal fiber 20. Illumination and light collection optics 40A and 40B are mounted on alignment stages 50A and 50B, respectively. Alignment stages 50A and 50B position illumination and light collection optics 40A and 40B appropriately with respect to photonic crystal fiber 20. A portion of the test light is reflected back to the illumination and light collection optics 40A and 40B, which now function as part of the detection system by gathering measurement light and coupling it back into optical fibers 60A and 60B. Directional couplers 70A and 70B separate measurement light propagating in optical fibers 60A and 60B from counter propagating test light. Directional couplers 70A and 70B direct the measurement light toward detector 100. Prior to impinging on detector 100, fiber optic coupler 90 combines measurement light in fibers 60A and 60B.

Detector 100 measures the spectral intensity of the measurement light, yielding a reflection spectrum R($\lambda$). The spectral data from detector 100 is recorded by controller 120 (e.g., a computer). In the embodiment shown in FIG. 1B, measurement light from fibers 60A and 60B are combined by a coupler 90 before being delivered to detector 100. Hence, detector 100 measures the spectral content of measurement light from opposite sides of fiber 20. In other embodiments, each fiber can direct light to an individual detector, each detector measuring a corresponding reflection spectrum.

Detector 100 includes a diffraction grating 105 and an array photodetector 110. For spectral resolution of about 5 $\mu$m to 10 $\mu$m, an inexpensive, short focal length fixed grating monochromators can be used (e.g., Oriel Instruments MS125) with diffraction gratings having line density 300 lines/mm and a blaze wavelength in the wavelength range utilized for the spectral measurements. Also, depending on the wavelength range, different types of detectors can be used. Cooled InGaAs photodiode linear array detectors may be employed for spectral measurements in the vicinity of the primary PBG, e.g., in the range of 1.2–2.5 $\mu$m. Cooled CCD linear arrays can be used for measurements in the vicinity of the secondary PBG, e.g., in the range of 0.7–1.1 $\mu$m. Array detectors and fixed-grating monochromators offer reasonable speed of operation. For example, the array detectors can be operated up to 1 MHz scanning rates and thus a 1024 element array can be scanned in about 1 to 2 ms. It is the minimal exposure time that determines the speed of spectral data acquisition. Given the high sensitivity of modern cooled photodetectors and using a number of high brightness light sources (such as, e.g., the Agilent 83437A EELED fiber-optic broadband light source for the wavelength range 1.2–1.7 μm or the high intensity metal-halide arc-lamp source for the wavelength range 0.7–1.0 μm), exposure times as short as 2 ms can be achieved. This allows acquiring the spectral data at a 500 Hz rate.

Figure 2:
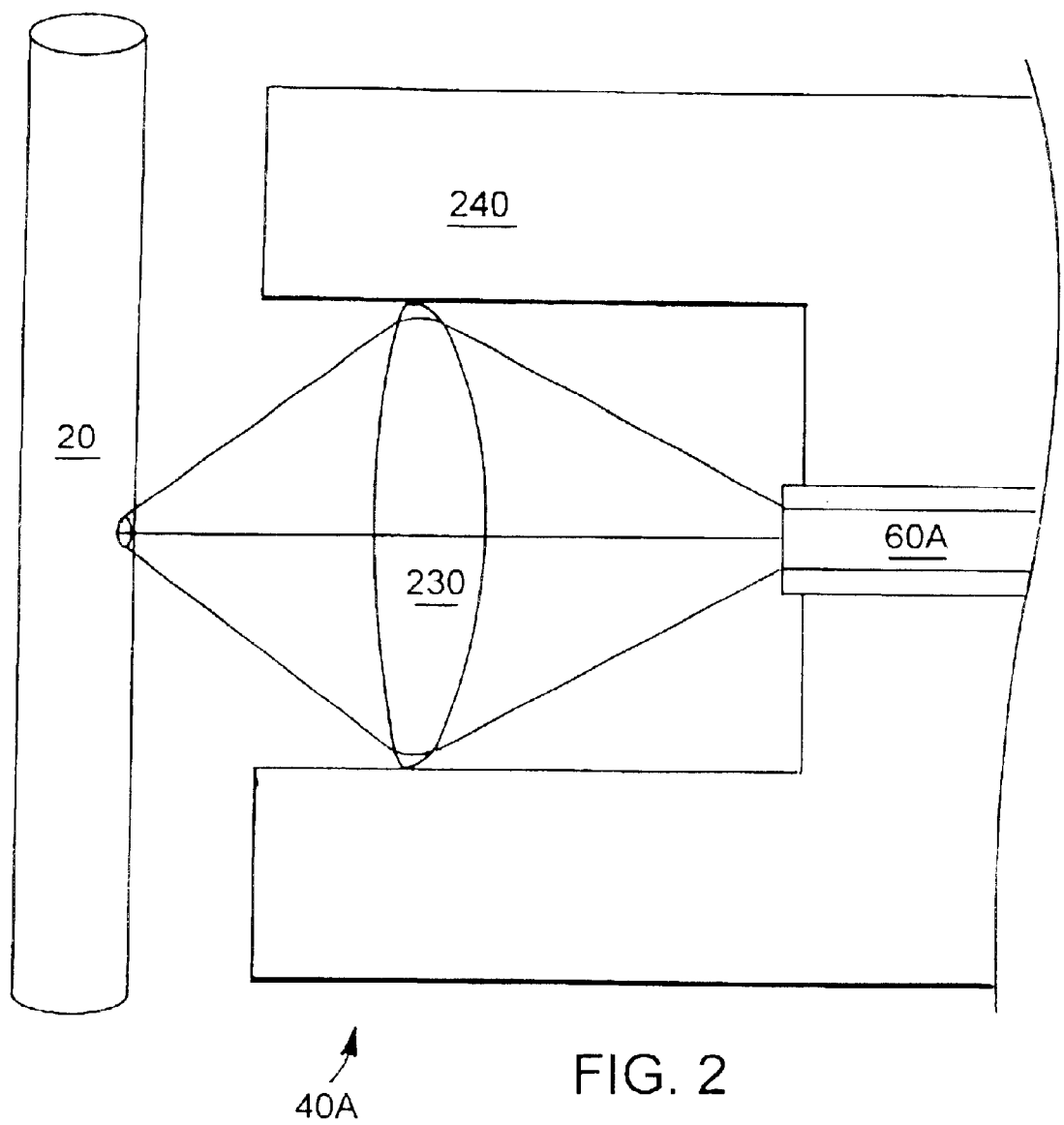
FIG. 2 is a cross-sectional view of an embodiment of optics for illuminating the side of an optical waveguide and collecting light reflected from the optical waveguide.

Referring to FIG. 2, illumination light collection optics 40A includes a holder 340 and a focusing lens 330. Focusing lens 330 focuses divergent test light emitted from optical fiber 60 onto the side of fiber 20. Focusing lens 330 also gathers measurement light reflected from fiber 20 and couples the measurement light into optical fiber 60. A holder 340 positions focusing lens 330 relative to fiber 60. Holder 340 is mounted on an alignment stage (not shown), which positions the focusing lens and fiber relative to fiber 20.

Figure 3:
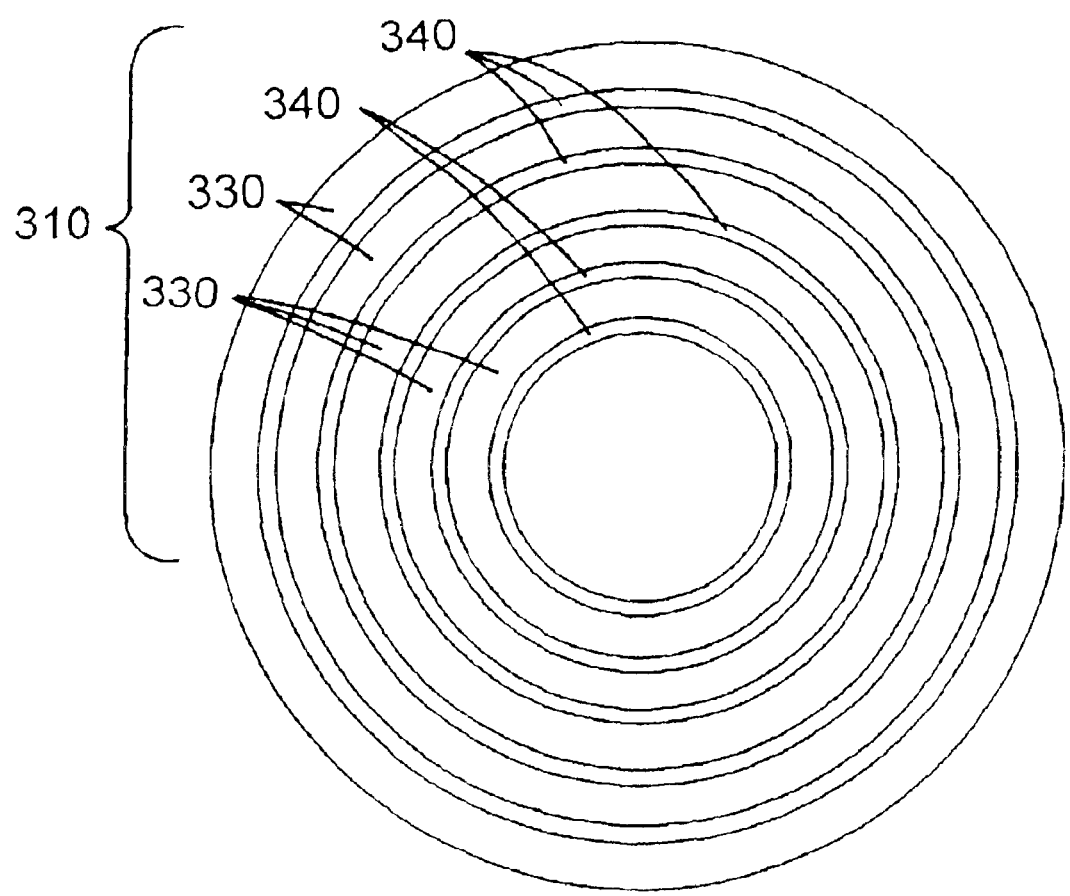
FIG. 3 is a cross-sectional view of an embodiment of a photonic crystal fiber.

The cross-section 20A of photonic crystal fiber 20 is shown in FIG. 3, and includes a dielectric core 320 extending along a waveguide axis and a dielectric confinement region 310 surrounding the core. In the embodiment of FIG. 3, confinement region 310 is shown to include alternating layers 330 and 340 of dielectric materials having different refractive indices. One set of layers, e.g., layers 340, define a high-index set of layers having an index $n_{hi}$ and a thickness $d_{hi}$, and the other set of layers, e.g., layers 330, define a low-index set of layers having an index $n_{lo}$ and a thickness $d_{lo}$, where $n_{hi} > n_{lo}$. For convenience only a few of the dielectric confinement layers are shown in FIG. 3. In practice, confinement region 310 may include many more layers (e.g., twenty or more layers).

Photonic crystal fiber 20 has a circular cross-section, with core 320 having a circular cross-section and region 310 (and layers therein) having an annular cross-section. In other embodiments, however, the waveguide and its constituent regions may have different geometric cross-section such as a rectangular or a hexagonal cross-section. Furthermore, as mentioned below, core and confinement regions 320 and 310 may include multiple dielectric materials having different refractive indices. In such cases, we may refer to an "average refractive index" of a given region, which refers to the sum of the weighted indices for the constituents of the region, where each index is weighted by the fractional area in the region of its constituent. The boundary between region 320 and 310, however, is defined by a change in index. The change may be caused by the interface of two different dielectric materials or by different dopant concentrations in the same dielectric material (e.g., different dopant concentrations in silica).

Dielectric confinement region 310 guides EM radiation in a first range of wavelengths to propagate in dielectric core 320 along the photonic crystal fiber axis. The confinement mechanism is based on a photonic crystal structure in region 310 that forms a bandgap including the first range of wavelengths. Because the confinement mechanism is not index-guiding, it is not necessary for the core to have a higher index than that of the portion of the confinement region immediately adjacent the core. To the contrary, core 320 may have a lower average index than that of confinement region 310. For example, core 320 may be air, some other gas, such as nitrogen, or substantially evacuated. In such a case, EM radiation guided in the core will have much smaller losses and much smaller nonlinear interactions than EM radiation guided in a silica core, reflecting the smaller absorption and nonlinear interaction constants of many gases relative to silica or other such solid material. In additional embodiments, for example, core 320 may include a porous dielectric material to provide some structural support for the surrounding confinement region while still defining a core that is largely air. Accordingly, core 320 need not have a uniform index profile.

The alternating layers 330 and 340 of confinement region 310 form what is known as a Bragg fiber. The alternating layers are analogous to the alternating layers of a planar dielectric stack reflector (which is also known as a Bragg mirror). The annular layers of confinement region 310 and the alternating planar layers of a dielectric stack reflector are both examples of a photonic crystal structure. Photonic crystal structures are described generally in *Photonic Crystals* by John D. Joannopoulos et al. (Princeton University Press, Princeton N.J., 1995).

As used herein, a photonic crystal is a dielectric structure with a refractive index modulation that produces a photonic bandgap in the photonic crystal. A photonic bandgap, as used herein, is a range of wavelengths (or inversely, frequencies) in which there are no accessible extended (i.e., propagating, non-localized) states in the dielectric structure. Typically the structure is a periodic dielectric structure, but it may also include, e.g., more complex "quasi-crystals." The bandgap can be used to confine, guide, and/or localize light by combining the photonic crystal with "defect" regions that deviate from the bandgap structure. Moreover, there are accessible extended states for wavelengths both below and above the gap, allowing light to be confined even in lower-index regions (in contrast to index-guided TIR structures). The term "accessible" states means those states with which coupling is not already forbidden by some symmetry or conservation law of the system. For example, in two-dimensional systems, polarization is conserved, so only states of a similar polarization need to be excluded from the bandgap. In a waveguide with uniform cross-section (such as a typical fiber), the wavevector β is conserved, so only states with a given β need to excluded from the bandgap to support photonic crystal guided modes. Moreover, in a waveguide with cylindrical symmetry, the "angular momentum" index m is conserved, so only modes with the same m need to be excluded from the bandgap. In short, for high-symmetry systems the requirements for photonic bandgaps are considerably relaxed compared to "complete" bandgaps in which all states, regardless of symmetry, are excluded.

Accordingly, the dielectric stack reflector is highly reflective in the photonic bandgap because EM radiation cannot propagate through the stack. Similarly, the annular layers in confinement region 310 provide confinement because they are highly reflective for incident rays in the bandgap. Strictly speaking, a photonic crystal is only completely reflective in the bandgap when the index modulation in the photonic crystal has an infinite extent. Otherwise, incident radiation can "tunnel" through the photonic crystal via an evanescent mode that couples propagating modes on either side of the photonic crystal. In practice, however, the rate of such tunneling decreases exponentially with photonic crystal thickness (e.g., the number of alternating layers). It also decreases with the magnitude of the index contrast in the confinement region.

Furthermore, a photonic bandgap may extend over only a relatively small region of propagation vectors. For example, a dielectric stack may be highly reflective for a normally incident ray and yet only partially reflective for an obliquely incident ray. A "complete photonic bandgap" is a bandgap that extends over all possible wavevectors and all polarizations. Generally, a complete photonic bandgap is only associated with a photonic crystal having index modulations along three dimensions. However, in the context of EM radiation incident on a photonic crystal from an adjacent dielectric material, we can also define an "omnidirectional photonic bandgap," which is a photonic bandgap for all possible wavevectors and polarizations for which the adjacent dielectric material supports propagating EM modes. Equivalently, an omnidirectional photonic bandgap can be defined as a photonic band gap for all EM modes above the light line, wherein the light line defines the lowest frequency propagating mode supported by the material adjacent the photonic crystal. For example, in air the light line is approximately given by $\omega=c\beta$, where $\omega$ is the angular frequency of the radiation, $\beta$ is the wavevector, and c is the speed of light. A description of an omnidirectional planar reflector is disclosed in U.S. Pat. No. 6,130,780, the contents of which are incorporated herein by reference. Furthermore, the use of alternating dielectric layers to provide omnidirectional reflection (in a planar limit) for a cylindrical waveguide geometry is disclosed in Published PCT application WO 00/22466, the contents of which are incorporated herein by reference.

When alternating layers 330 and 340 in confinement region 310 give rise to an omnidirectional bandgap with respect to core 320, the guided modes are strongly confined because, in principle, any EM radiation incident on the confinement region from the core is completely reflected. However, such complete reflection only occurs when there are an infinite number of layers. For a finite number of layers (e.g., about 20 layers), an omnidirectional photonic bandgap may correspond to a reflection in a planar geometry of at least 95% for all angles of incidence ranging from 0° to 80° and for all polarizations of EM radiation having frequency in the omnidirectional bandgap. Furthermore, even when photonic crystal fiber 30 has a confinement region with a bandgap that is not omnidirectional, it may still support a strongly guided mode, e.g., a mode with radiation losses of less than 0.1 dB/km for a range of frequencies in the bandgap. Generally, whether or not the bandgap is omnidirectional will depend on the size of the bandgap produced by the alternating layer (which generally scales with index contrast of the two layers) and the lowest-index constituent of the photonic crystal.

In additional embodiments, the dielectric confinement region may include photonic crystal structures different from a multilayer Bragg configuration. For example, rather than the Bragg configuration, which is an example of a one-dimensionally periodic photonic crystal (in the planar limit), the confinement region may be selected to form, for example, a two-dimensionally periodic photonic crystal (in the planar limit), such as an index modulation corresponding to a honeycomb structure. See, for example, R. F. Cregan et al., Science 285:1537–1539, 1999. Furthermore, even in a Bragg-like configuration, the high-index layers may vary in index and thickness, and/or the low-index layers may vary in index and thickness. In general, the confinement region may be based on any index modulation that creates a photonic bandgap.

In the present embodiment, multilayer structure 310 forms a Bragg reflector because it has a periodic index variation with respect to the radial axis. A suitable index variation is an approximate quarter-wave condition. It is well-known that, for normal incidence, a maximum band gap is obtained for a "quarter-wave" stack in which each layer has equal optical thickness $\lambda/4$, or equivalently $d_{340}/d_{330}=n_{lo}/n_{hi}$, where d and n refer to the thickness and index, respectively, of the high-index and low-index layers. These correspond to layers 340 and 330, respectively. Normal incidence corresponds to $\beta=0$. For a cylindrical waveguide, the desired modes typically lie near the light line $\omega=c\beta$ (in the large core radius limit, the lowest-order modes are essentially plane waves propagating along z-axis, i.e., the waveguide axis). In this case, the quarter-wave condition becomes:

$$\frac{d_{340}}{d_{330}} = \frac{\sqrt{n_{lo}^2 - 1}}{\sqrt{n_{hi}^2 - 1}}$$

Strictly speaking, this equation may not be exactly optimal because the quarter-wave condition is modified by the cylindrical geometry, which may require the optical thickness of each layer to vary smoothly with its radial coordinate. Nonetheless, we find that this equation provides an excellent guideline for optimizing many desirable properties, especially for core radii larger than the mid-bandgap wavelength.

Figure 4:
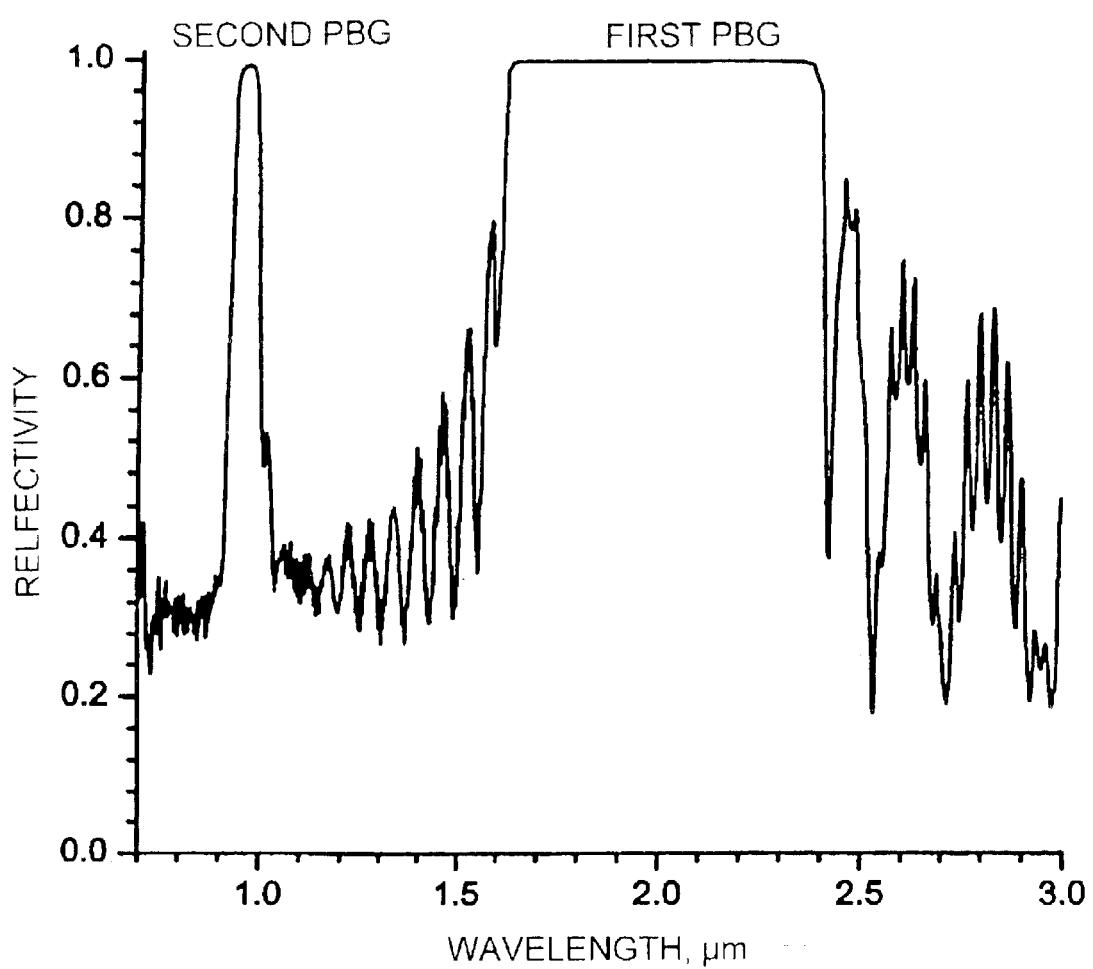
FIG. 4 is the reflectance spectrum of a defect-free photonic crystal fiber showing the primary and secondary photonic band gap.

Referring to FIG. 4, spectral reflectance for a photonic crystal fiber is shown calculated for reflection at normal incidence from the side of an exemplary hollow fiber, disclosed in U.S. Ser. No. 10/057,258, entitled "LOW-LOSS PHOTONIC CRYSTAL WAVEGUIDE HAVING LARGE CORE RADIUS" and filed Jan. 25, 2002, now issue as U.S. Pat. No. 6,625,364. The fiber is designed to carry light at telecommunications wavelengths centered at 1.55 $\mu$m. Nominal values for the refractive indexes and layer thickness are $n_{lo}=1.5$, $n_{hi}=2.8$, $d_{330}=0.363$ $\mu$m, $d_{340}=0.149$ $\mu$m. The multilayer cladding has 28 layers, and the core radius is taken to be 15.4 $\mu$m. Theoretical reflectance values were calculated using the modeling methods described by Steven G. Johnson et al., "Low-loss asymptotically single-mode propagation in large core OmniGuide fibers," Optics Express, 9 (13), pp.748–779 (2001) and references therein, which is incorporated herein by reference. An average over a range of angles of incidence from −10 degrees to +10 degrees is used in the calculation to account for illumination light beam divergence.

The spectrum includes two bands in which the reflectance is close to 100%. The two bands are the primary and secondary photonic band gaps (PBGs). The primary PBG is at longer wavelengths (i.e., centered at about 1.95 $\mu$m) than the designed PBG center wavelength for light propagating along the waveguide axis. The wavelength shift in the PBG center wavelength is due to the different angles of incidence for test light (i.e., close to 0 degrees—near normal incidence) and light propagating along the waveguide axis (where the incidence angle is close to 90 degrees). This shift from near normal incidence to near parallel incidence (with respect to the waveguide axis) results in a shift to shorter wavelengths, centering the propagation PBG at about 1.55 $\mu$m. The secondary PBG is centered at about 1.0 $\mu$m.

Perturbations to the photonic crystal structure can result in variations in the reflection spectrum from the defect-free fiber reflection spectrum. Hence, by comparing a measured reflection spectrum to a reference spectrum it is possible to identify regions of the photonic crystal fiber having structural and/or compositional defects.

Figure 5A:
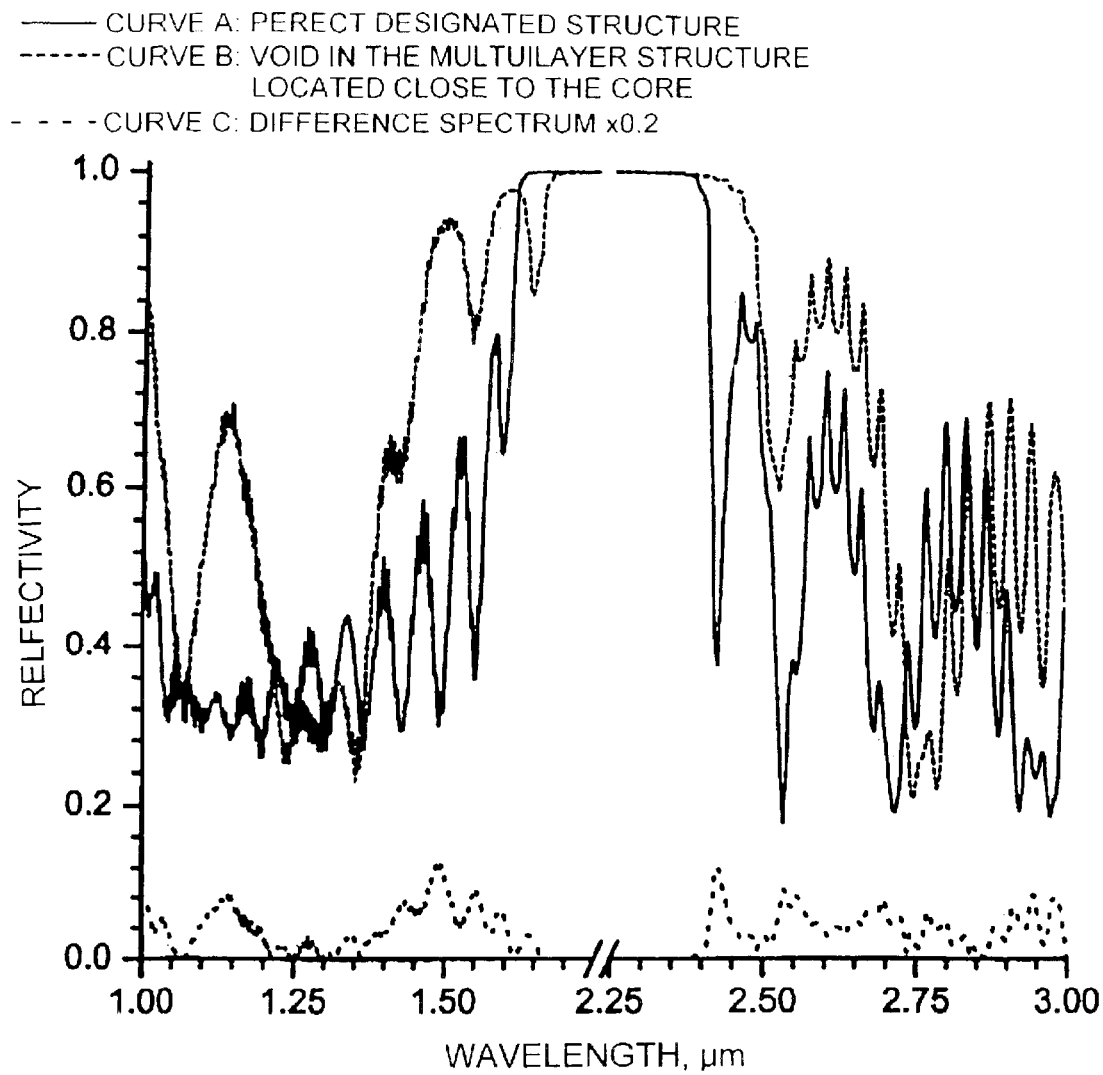
FIG. 5A are the reflectance spectra of the defect free photonic crystal fiber and a photonic crystal fiber with a void in the multilayer structure located close to the core, and the difference spectrum in the vicinity of the primary photonic band gap.

We will now compare exemplary theoretical reflection spectra of flawed photonic crystal fibers to the theoretical reference spectrum of the defect-free fiber. Referring to FIG. 5A, the reflection spectra calculated for a defect-free fiber and a defective fiber are shown in the vicinity of the primary PBG. The spectra were calculated assuming an instrumental resolution of 0.005 µm. Curve A is the reflection spectrum of the fiber with the designed and defect free PBG structure, which is the reference spectrum, $R_{reference}(\lambda)$. Curve B is the spectrum obtained for the fiber where a void defect is present inside the multilayer structure, located close to the hollow core, and is the measured spectrum $R_{measured}(\lambda)$ The void defect has a refractive index n=1.0 (i.e., the refractive index of air) and the void size is 2.5 µm in the direction transverse to the waveguide axis. The extent of the defect in the direction along the waveguide axis correlates to the drawing speed and the spectra acquisition and analysis speed. The extent of the defect in the direction along the waveguide axis can range from a few millimeters to several meters. For this calculation it is assumed that the detection system is fast enough to detect a defect at a given drawing speed.

Curve C shows the absolute value of the difference between the two spectra given by curves A and B, multiplied by a factor of 0.2 for better presentation on the graph. We refer to this data as a difference spectrum, which can be expressed mathematically as $\Delta(\lambda)=|R_{reference}(\lambda)-R_{measured}(\lambda)|$.

As is evident in FIG. 5A, the void in the multilayer causes the PBG to be offset to slightly higher wavelengths than the defect-free case. Additionally, the void causes increased reflectance a several satellite peaks located at wavelengths both shorter and longer than the PBG wavelengths. The difference spectrum thus has a measurable signal at the PBG edges and outside the PBG, but with negligible signal at the PBG wavelengths. By "measurable signal" we mean the signal strength of the difference spectrum is large enough to be attributed to the reflectance of the photonic crystal fiber over any noise present in the measurement.

The difference spectrum, $\Delta(\lambda)$, can be integrated over a chosen wavelength range (e.g., over the primary PBG) to provide an error signal value, $\Gamma$, used for defect detection:

$$\Gamma = \int_{\lambda_1}^{\lambda_2} \Delta(\lambda) d\lambda.$$

Here, the error signal, $\Gamma$, is determined by integrating the difference function from a first wavelength, $\lambda_1$, to a second wavelength, $\lambda_2$. The error signal can also be averaged over the wavelength range according to:

$$\gamma = \frac{\int_{\lambda_1}^{\lambda_2} \Delta(\lambda) d\lambda}{\int_{\lambda_1}^{\lambda_2} d\lambda}.$$

The difference spectrum can additionally be convolved with a weighting function, $w(\lambda)$, to enhance sensitivity of the error signal to certain parts of the spectrum relative to the other parts. The weighted error signal can be expressed as:

$$\Gamma = \int_{\lambda_1}^{\lambda_2} \Delta(\lambda) w(\lambda) d\lambda.$$

In some embodiments, a target error signal value, $\Gamma_{tgt}$, can be specified so that the controller registers a defect when the detected error signal value exceeds the threshold error signal value (i.e., when $\Gamma > \Gamma_{tgt}$).

Monitoring the wavelength region in the vicinity of the secondary PBG (i.e., around 1.0 µm) may have certain advantages over monitoring the primary PBG in certain implementations since sensitive detectors (e.g., CCD array detectors) and/or bright light sources (e.g., miniature arc lamps) are more readily available for this region of the electromagnetic spectrum.

Figure 5B:
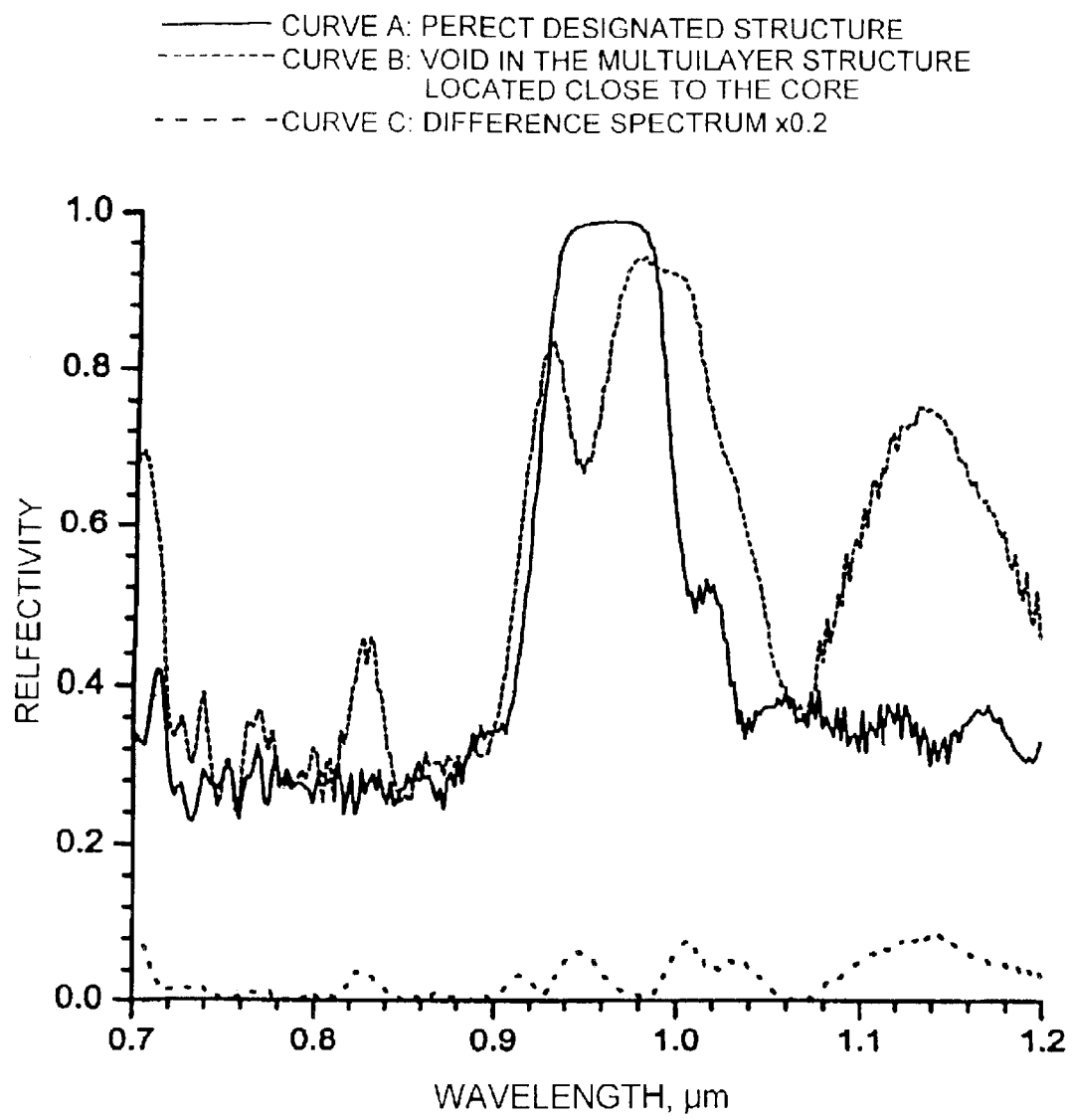
FIG. 5B are the reflectance spectra of the defect free photonic crystal fiber and a photonic crystal fiber with a void in the multilayer structure located close to the core, and the difference spectrum in the vicinity of the secondary photonic band gap.

Referring to FIG. 5B, the calculated reflection spectrum in the vicinity of the secondary PBG for the above-mentioned exemplary defect free fiber (curve A) is compared to the reflection spectrum of the defective fiber described in reference to FIG. 5A (curve B). The difference spectrum, curve C, is again multiplied by 0.2 to better show the difference spectrums structure on the current axes. The spectrum of the defective fiber shows reduced reflection near the secondary PBG wavelengths (i.e., the reflectance at about 0.95 µm falls from 100% for a defect free fiber to about 70% for the defective fiber). This results in a difference spectrum signal at the secondary PBG center wavelengths. Additionally, the PBG edges of the defective fiber spectrum are shifted slightly from the defect-free fiber spectrum. This results in a measurable difference spectrum signal at the PBG edge wavelengths. There is also a significant satellite peak in the defective fiber spectrum at about 1.15 µm, contributing to a measureable difference spectrum signal at those wavelengths.

Figure 6A:
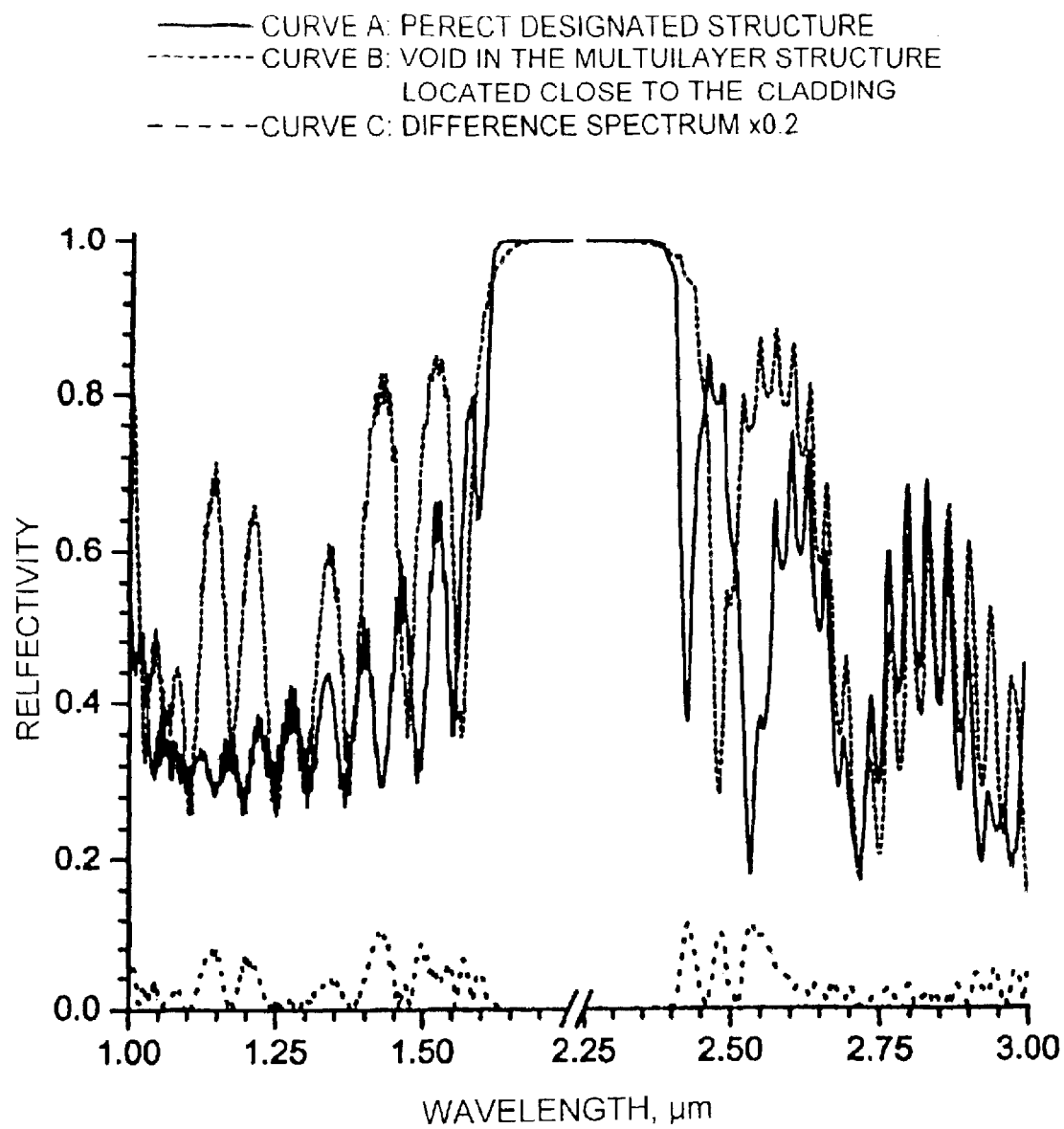
FIG. 6A are the reflectance spectra of the defect free photonic crystal fiber and a photonic crystal fiber with a void in the multilayer structure located close to the cladding, and the difference spectrum in the vicinity of the primary photonic band gap.

Referring to FIG. 6A, the calculated reflection spectrum in the vicinity of the primary PBG for the above-mentioned exemplary defect free fiber (curve A) is compared to the reflection spectrum of a similar fiber structure with a small (2.5 µm in the direction transverse to the fiber) void defect in the multilayer structure (modeled as layers with the refractive index set to 1), located near the outer surface of the fiber (curve B). The void located close to the cladding in the defective fiber causes a marginal change in the position of the PBG edges compared to the defect-free fiber. We notice that the primary PBG is broadened slightly, shifted to a shorter wavelength at the PBG edge located at about 1.6 µm, and shifting to a longer wavelength at the 2.4 µm PBG edge. Additionally, the reflectance at wavelengths on either side of the primary PBG changes. This results in minimal difference spectrum signal within the PBG wavelengths, but a measurable difference spectrum signal at the PBG edge wavelengths and outside the PBG.

Figure 6B:
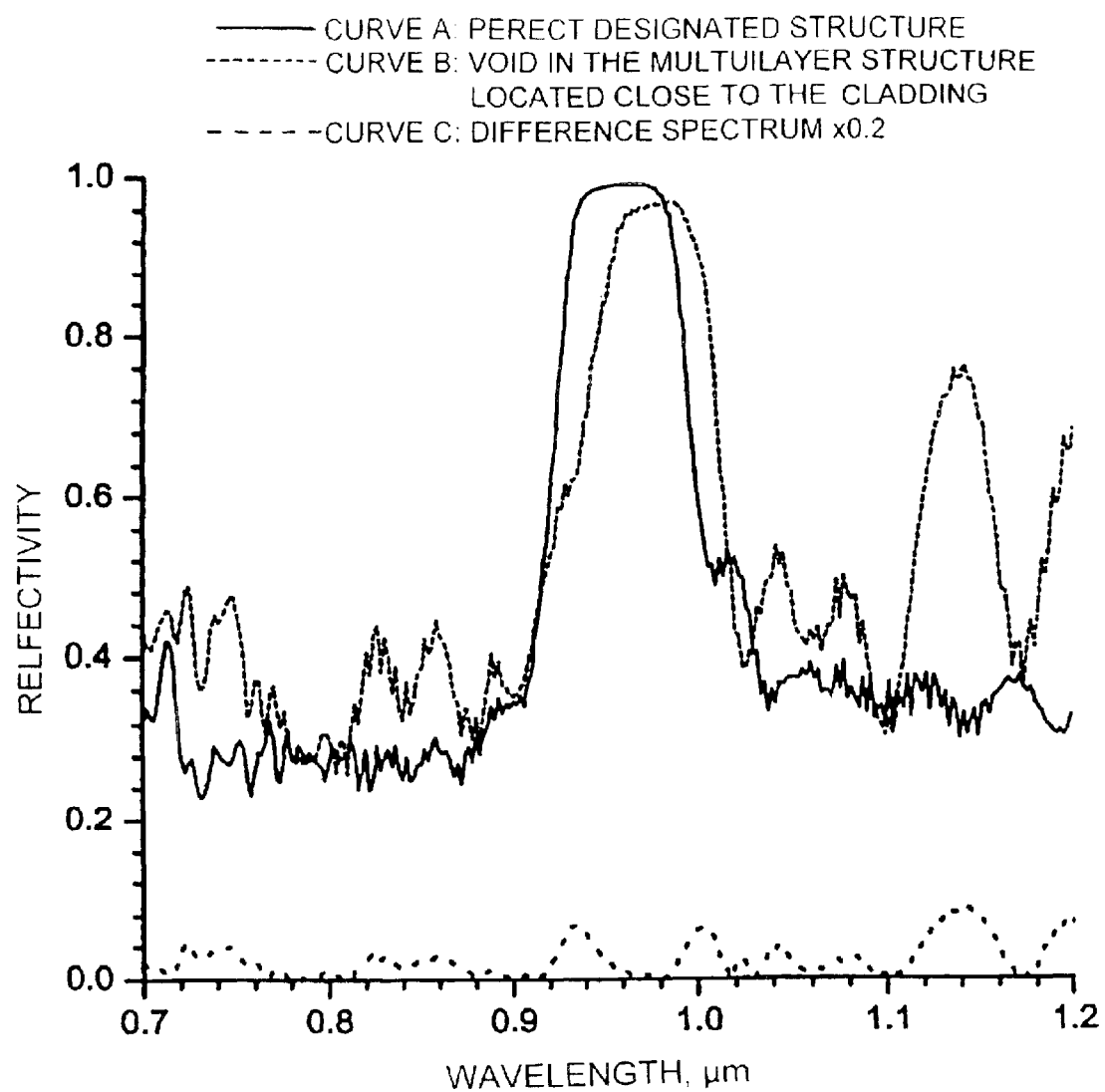
FIG. 6B are the reflectance spectra of the defect free photonic crystal fiber and a photonic crystal fiber with a void in the multilayer structure located close to the cladding, and the difference spectrum in the vicinity of the secondary photonic band gap.

Referring to FIG. 6B, the calculated reflection spectrum in the vicinity of the secondary PBG for the above-mentioned exemplary defect free fiber (curve A) is compared to the reflection spectrum of the defective fiber described in reference to FIG. 6A (curve B). The affect of this defect on the reflection spectrum is to shift the secondary PBG to slightly higher wavelengths compared to the defect-free fiber spectrum. As a result, the difference spectrum has a measurable signal at the PBG edge wavelengths. There is also a substantial satellite peak at about 1.15 µm in the defective fiber spectrum, giving rise to a measurable difference spectrum signal at that wavelength.

Figure 7A:
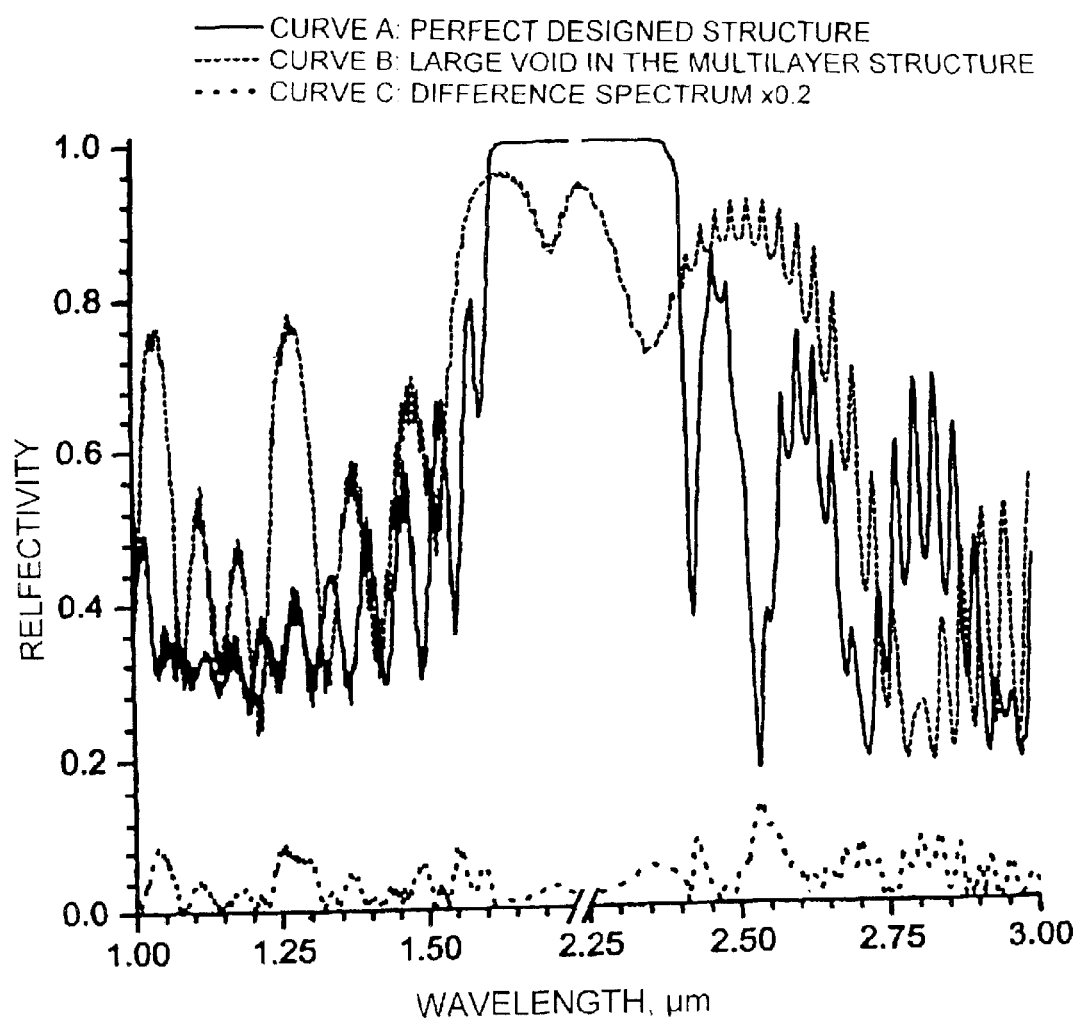
FIG. 7A are the reflectance spectra of the defect free photonic crystal fiber and a photonic crystal fiber with a large void in the multilayer structure, and the difference spectrum in the vicinity of the primary photonic band gap.

Referring to FIG. 7A, the calculated reflection spectrum in the vicinity of the primary PBG for the above-mentioned exemplary defect free fiber (curve A) is compared to the reflection spectrum of a similar fiber structure with a larger (5.1 µm in the direction transverse to the fiber) void defect in the multilayer structure (modeled as layers with the refractive index set to 1) (curve B). The defect causes a substantial change in the reflectance at the PBG wavelengths shown. There is also a significant change in the reflectance at wavelengths outside of the primary PBG. The resulting difference spectrum has a measurable signal both within and outside the PBG. Note that both an increase in reflectance (e.g., at about 2.6 µm) and a decrease in reflectance (e.g., at about 2.8 µm) of the defective fiber spectrum with respect to the defect-free fiber spectrum results in a measurable difference spectrum signal.

Figure 7B:
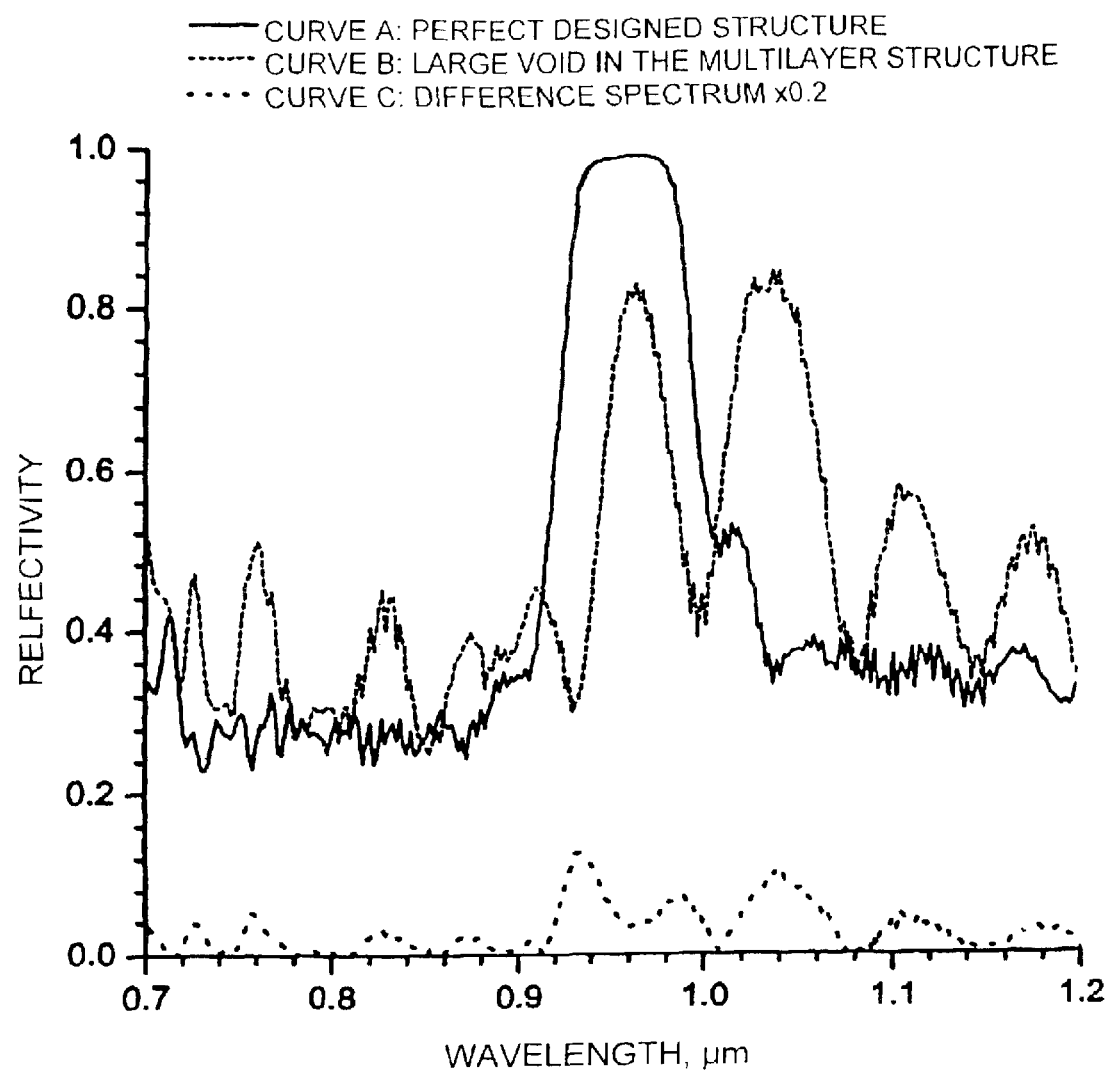
FIG. 7B are the reflectance spectra of the defect free photonic crystal fiber and a photonic crystal fiber with a large void in the multilayer structure, and the difference spectrum in the vicinity of the secondary photonic band gap.

Referring to FIG. 7B, the calculated reflection spectrum in the vicinity of the secondary PBG for the above-mentioned exemplary defect free fiber (curve A) is compared to the reflection spectrum of the defective fiber described in reference to FIG. 7A (curve B). The reflectance of the defective fiber is reduced at the secondary PBG, resulting in a measurable difference spectrum signal at these wavelengths. Additionally, several satellite peaks appear in the defective fiber spectrum at wavelengths longer than the PBG wavelengths. These satellite peaks are mirrored as peaks in the difference spectrum.

Figure 8A:
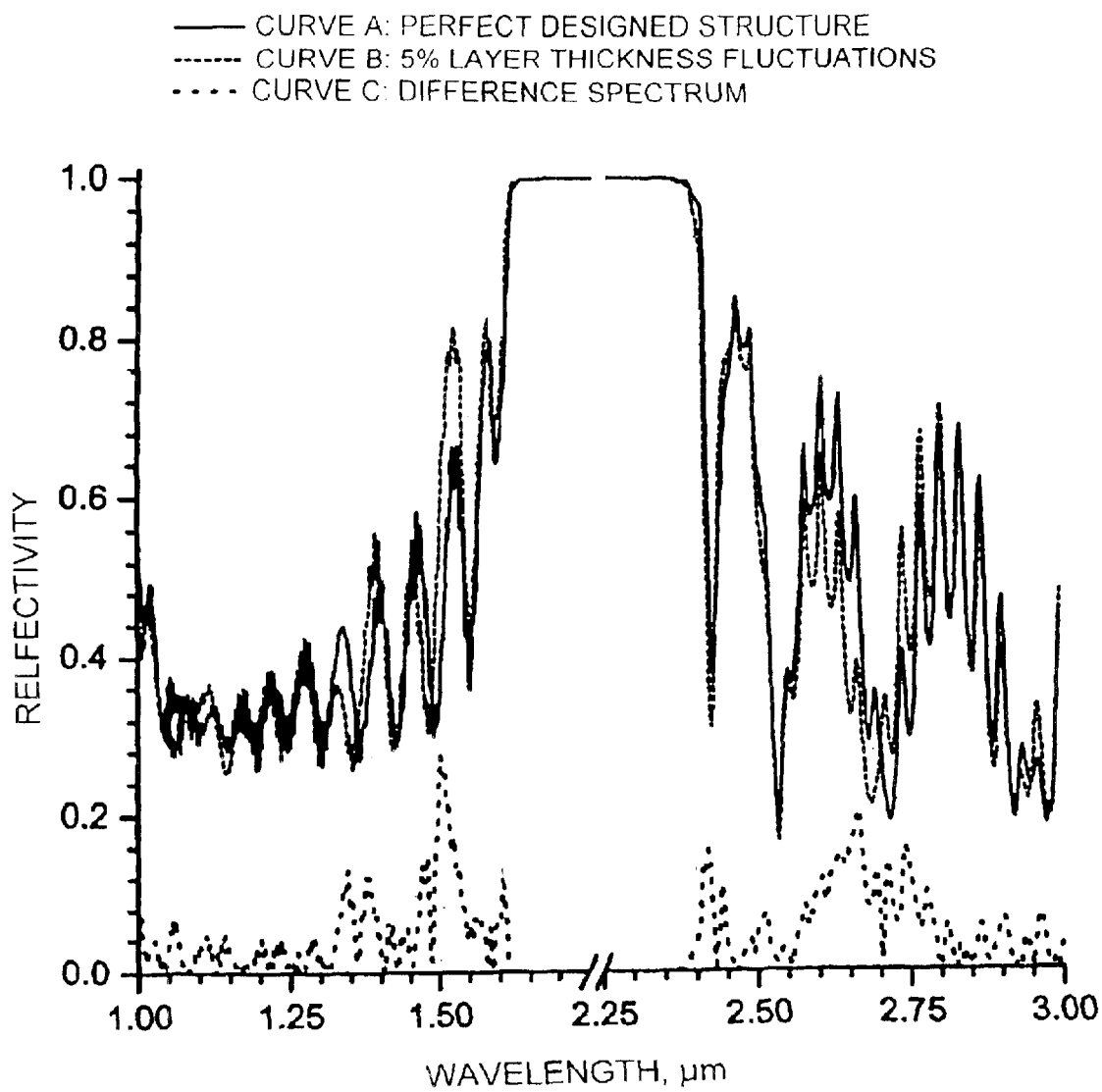
FIG. 8A are the reflectance spectra of the defect free photonic crystal fiber and a photonic crystal fiber with 5% layer thickness fluctuations, and the difference spectrum in the vicinity of the primary photonic band gap.

Referring to FIG. 8A, the calculated reflection spectrum in the vicinity of the primary PBG for the above-mentioned exemplary defect free fiber (curve A) is compared to the reflection spectrum of a similar fiber structure perturbed by random fluctuations of its layer thickness within 5% of its designed thickness (curve B). The PBG reflectance of the defective fiber is virtually unchanged from that of the defect-free fiber. However, variations in the reflectance of the defective fiber at wavelengths outside the PBG give rise to measurable difference spectrum signals at those wavelengths.

Figure 8B:
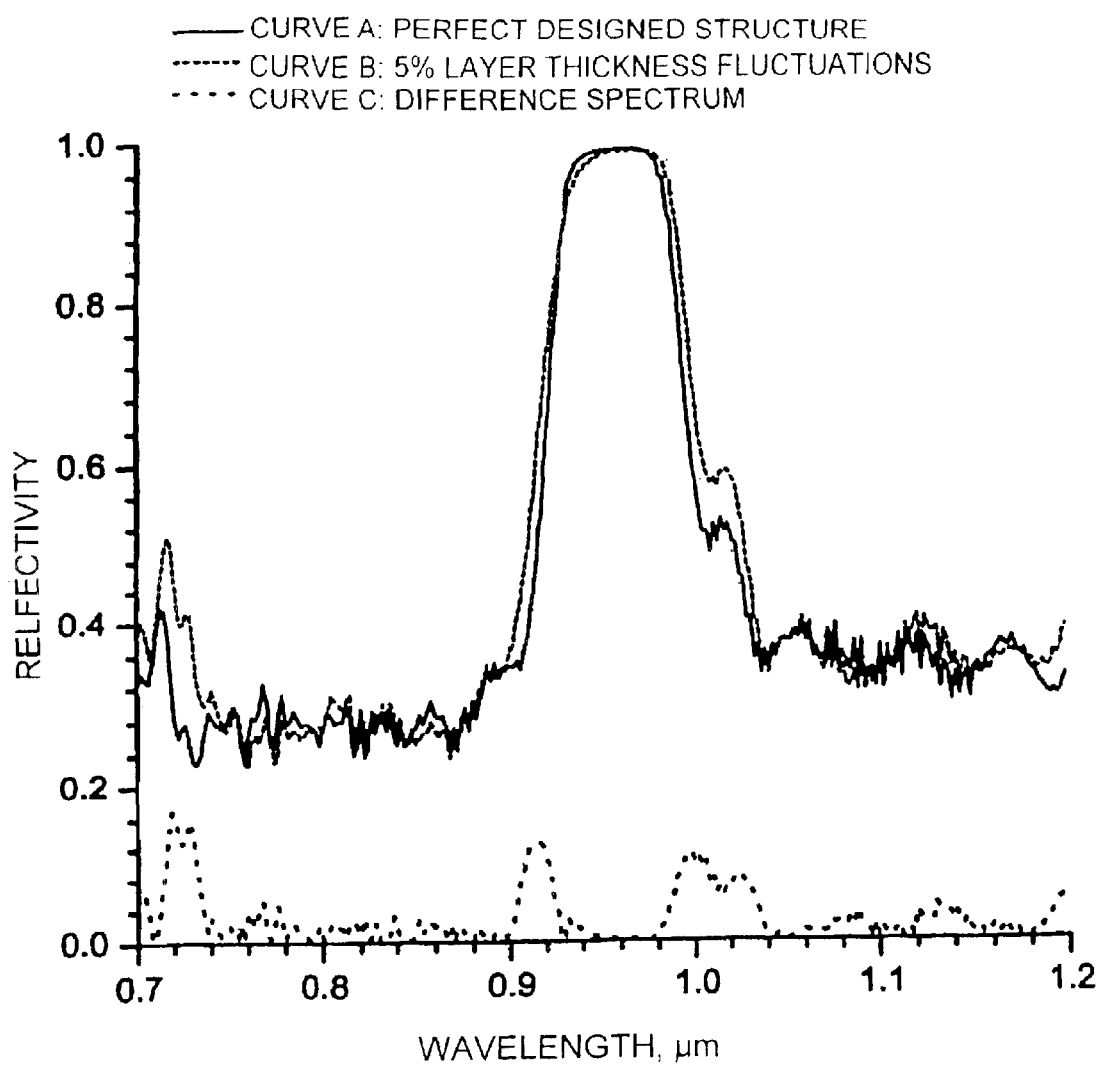
FIG. 8B are the reflectance spectra of the defect free photonic crystal fiber and a photonic crystal fiber with 5% layer thickness fluctuations, and the difference spectrum in the vicinity of the secondary photonic band gap.

Referring to FIG. 8B, the calculated reflection spectrum in the vicinity of the secondary PBG for the above-mentioned exemplary defect free fiber (curve A) is compared to the reflection spectrum of the defective fiber described in reference to FIG. 8A (curve B). The affect of the defect on the reflectance spectrum includes slightly broadening the secondary PBG. This results in a measurable difference spectrum signal at the PBG edge wavelengths.

Thus, in the currently described embodiment, the foregoing method includes measuring the spectrum of light reflected from the side of a photonic crystal fiber; calculating the difference between the measured spectrum for the fiber and a reference spectrum for defect free fiber; and integrating the difference spectrum over a range of wavelengths to obtain an error signal. An increase in the error signal above a certain threshold value indicates the presence of a defect (e.g., a structural and/or compositional defect in the inspected fiber).

Figure 9:
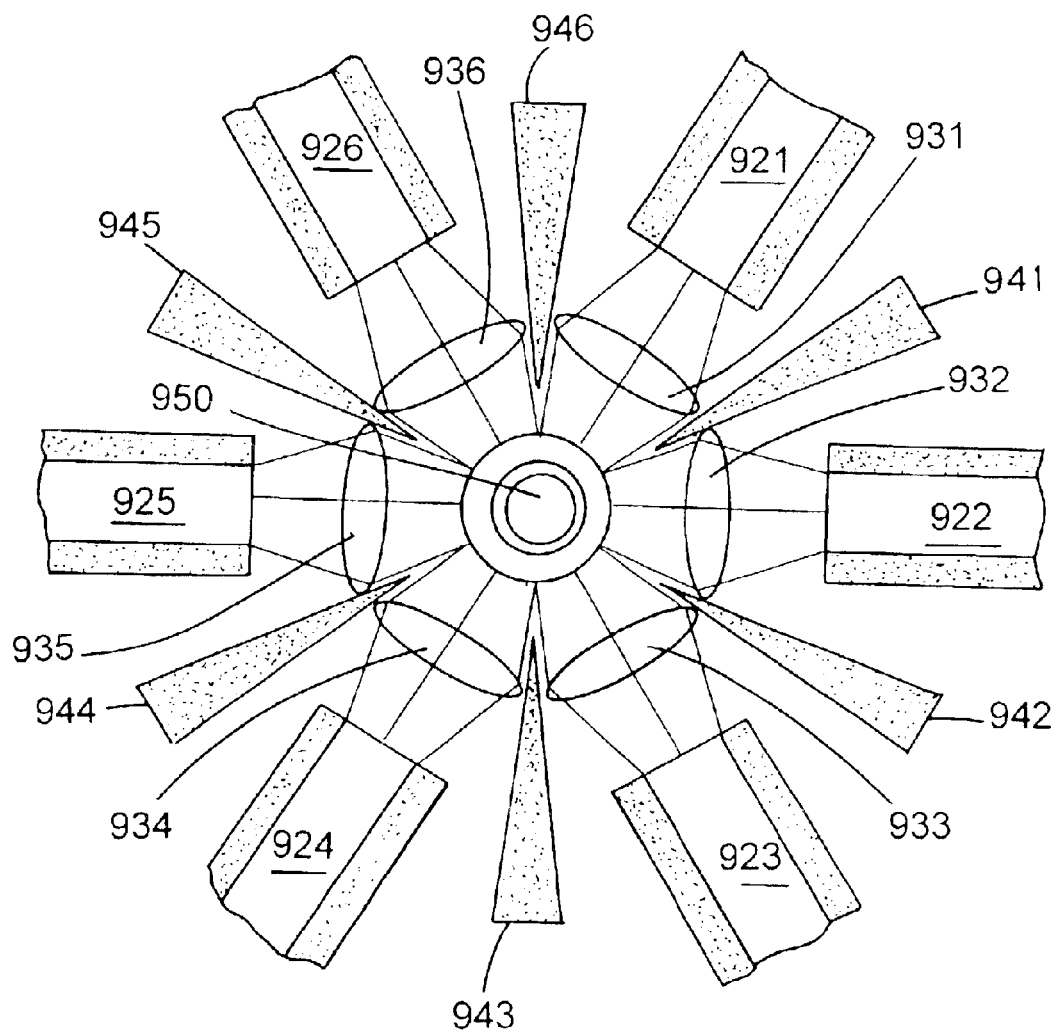
FIG. 9 is a plan view of an embodiment of light launching and collecting optics for illuminating and collecting light reflected by an optical waveguide.

While the above-described embodiment is in reference to a system that illuminates a photonic crystal fiber with test light at two positions of the side of the fiber, other embodiments are also within the scope of the invention. In general, the illumination system can direct test light to any number of positions. For example, the illumination system can direct light to only one position on the side of the fiber. Alternatively, in other embodiments, the illumination system can direct test light to more than two positions on the fiber. For example, FIG. 9 shows an embodiment in which the fiber is illuminated with test light at six positions around its circumference. The illumination and light collection optics include six optical waveguides 921–926, each positioned to direct light to and from a corresponding lens 931–936. Six assembly holders 941–946 hold lenses 931–936 in position. Each fiber and lens directs test light to a portion of the circumference of photonic crystal fiber 950, and collects measurement light reflected from the side of the fiber. Note, that the present arrangement illuminates approximately the whole circumference of the fiber 950. While six waveguide/lens systems are shown for this arrangement, in general the number of waveguide/lens systems depends on the fiber diameter and the specific optics of the waveguide/lens systems, and on the specifics of the system cost/performance requirements.

In general, the light source(s) can be any light source(s) capable of producing light having the desired spectral composition. For example, suitable light sources include diodes, arc lamps, and fluorescent lamps. In some preferred embodiments, the light source(s) provide light of sufficient intensity at the wavelengths of interest such that the signal-to-noise ratio of the detected light is not limited by the light source(s). In these implementations, the acquisition time of the detection system is limited by the speed of the detector and not the signal strength of the measurement light.

In some embodiments, the light source can include one or more narrow band or monochromatic sources. The spectral characteristics of such sources can be chosen specific to the PBG wavelengths. For example, the light source can include a number of laser diodes having a laser wavelength at or near the PBG edges. The light source(s) can be pulsed or continuous, and can include any number of filters and/or other optical components to modify the light source spectrum, pulse width, beam shape, polarization, etc. to provide the desired test light to the fiber being monitored.

In the implementation depicted in FIG. 1B, detector 100 is a diffraction grating spectrometer with an array photodetector, however, detector 100 can be any detector capable of spectrally detecting light at the desired wavelengths. For example, detector 100 can be a near-IR Fourier transform spectrometer. Alternatively, or additionally, rather than obtaining and analyzing the reflection spectrum over a large wavelength interval, one or several narrower wavelength regions either in the vicinity of the primary PBG or other PBGs (e.g., the secondary PBG) can be measured. Single element detectors (rather than e.g., detector arrays) can also be used. The detection system can include one or more wavelength filters to spectrally filter light before the light impinges on the detector(s). A consideration in selecting the spectroscopic technique and instrumentation is the speed of spectra acquisition and analysis. The speed of spectra acquisition can determine the minimal extent of the PBG perturbations along the fiber that can be readily detected for a given fiber drawing speed.

Moreover, the foregoing techniques can be used to monitor articles other than photonic crystal fibers. In general, the methods and apparatus described above can be applied to any optical device, including optical waveguides, whose reflection spectrum is dependent on the devices structure and composition.

Furthermore, analysis of the measurement light is not limited to comparing the measured reflected light spectrum to a reference spectrum. Analysis of the measured light can simply include studying the measurement spectrum itself, or with respect to some other benchmark. Alternatively, or additionally, analysis can include determining an error signal that is any function of the measured reflectance spectrum:

$$\Gamma = f(R_{measurement}(\lambda)).$$

For example, the error signal can be determined as the average reflectance of the wavelength range spanned by the PBG. In another example, such as the embodiment described in detail herein, the analysis can include determining an error signal that is a function of the measured reflectance spectrum and a reference spectrum:

$$\Gamma = f(R_{measurement}(\lambda), R_{reference}(\lambda)).$$

In yet another example, the error signal can be determined as a function of two different measured reflectance spectra:

$\Gamma = f(R_1(\lambda), R_2(\lambda))$.

This example can include embodiments where the analysis compares the reflectance spectra measured at two different positions on the circumference of the photonic crystal fiber, or at two different times during the fiber drawing. Note that the error signal can also be a function of wavelength (i.e., $\Gamma = \Gamma(\lambda)$), and need not be a single value for each section of fiber monitored.

A number of embodiments of the invention have been described. Nevertheless, it will be understood that various modifications may be made without departing from the spirit and scope of the invention. For example, the illumination system and detection system need not share common components, as shown in FIG. 1. The measurement light can be gathered by independent light collection optics. Also, the measurement light need not be light back-reflected by the photonic crystal fiber. Measurement light can also be light reflected by the fiber at glancing angles. Measurement light can also be light transmitted by the photonic crystal fiber, or light scattered by the fiber. Accordingly, other embodiments are within the scope of the following claims.

What is claimed is:

1. A method comprising:
   directing test light toward a side of a photonic crystal fiber, wherein the test light is related to a estimated bandgap of the photonic crystal fiber;
   detecting measurement light emerging from the photonic crystal fiber in response to the test light; and
   determining a deviation between an actual bandgap of the photonic crystal fiber and the estimated bandgap based on the measurement light.

2. The method of claim 1, wherein the emerging light comprises reflected light.

3. The method of claim 1, wherein determining the deviation comprises determining a measurement spectrum of the measurement light.

4. The method of claim 3, wherein determining the deviation further comprises determining an error signal that is based on a function of the measurement spectrum.

5. The method of claim 4, wherein the function of the measurement spectrum is also a function of a reference spectrum.

6. The method of claim 5, wherein the reference spectrum is related to the estimated bandgap.

7. The method of claim 5, wherein the reference spectrum is a theoretically determined or empirically determined reference spectrum.

8. The method of claim 5, wherein the function is related to a difference between the measurement spectrum and the reference spectrum.

9. The method of claim 5, wherein the function is related to a weighted difference between the measurement spectrum and the reference spectrum.

10. The method of claim 1, further comprising drawing a photonic crystal fiber preform into the photonic crystal fiber while the measurement light is detected.

11. The method of claim 10, further comprising adjusting draw parameters based on the determined deviation.

12. The method of claim 1, wherein the photonic crystal fiber is a Bragg fiber.

13. The method of claim 1, wherein the photonic crystal fiber is designed to guide light having a wavelength between 1.2 microns and 1.7 microns.

14. The method of claim 1, wherein the photonic crystal fiber is designed to guide light having a wavelength between 0.7 microns and 1.0 microns.

15. The method of claim 1, wherein measurement light is detected over a range of angles.

16. The method of claim 1, wherein the detection of measurement light comprises collecting the measurement light with light collecting optics.

17. The method of claim 1, wherein the deviation is related to structural defects in the photonic crystal fiber.

18. The method of claim 1, wherein the deviation is related to compositional defects in the photonic crystal fiber.

19. The method of claim 1, wherein determining the deviation comprises detecting a differences between a measurement spectrum related to the measurement light and a reference spectrum.

20. The method of claim 1, wherein directing the test light comprises directing the test light to different regions of the photonic crystal fiber.

21. The method of claim 1, wherein directing the test light comprises simultaneously directing test light to the different regions of the photonic crystal fiber.

22. The method of claim 21, wherein detecting the measurement light comprises detecting the measurement light emerging from the regions of the photonic crystal fiber.

23. The method of claim 22, wherein determining the deviation comprises determining a measurement spectrum of each region of the photonic crystal fiber based on the measurement light.

24. The method of claim 1, wherein directing the test light includes focusing the test light onto the side of the photonic crystal fiber.

25. The method of claim 24, wherein detecting the measurement light includes gathering the measurement light scattered from the side of the photonic crystal fiber.

26. The method of claim 25, wherein a single optical component performs the focusing and gathering.

27. The method of claim 1, wherein the photonic crystal fiber comprises a confinement region forming a two-dimensional photonic crystal.

28. A method comprising:
    directing broadband test light to a side of a photonic crystal optical waveguide;
    detecting measurement light reflected from the photonic crystal optical waveguide in response to the test light;
    determining a measurement spectrum from the measurement light intensity at a plurality of wavelengths related to a bandgap of the photonic crystal waveguide; and
    monitoring optical properties of the photonic crystal optical waveguide based on a measurement spectrum of the measurement light.

29. The method of claim 28, wherein monitoring the optical properties of the photonic crystal optical waveguide comprises comparing the measurement spectrum to a reference spectrum.

30. The method of claim 28, wherein monitoring the optical properties of the photonic crystal optical waveguide comprises detecting structural defects in the photonic crystal optical waveguide.

31. The method of claim 30, wherein forming the photonic crystal optical waveguide comprises drawing an optical waveguide preform into the photonic crystal optical waveguide.

32. The method of claim 31, further comprising adjusting a draw parameter for the drawing based on the photonic crystal optical waveguide quality.

33. The method of claim 28, wherein monitoring the optical properties of the photonic crystal optical waveguide comprises detecting compositional defects in the photonic crystal optical waveguide.

34. The method of claim 28, wherein the photonic crystal optical waveguide is a photonic crystal fiber.

35. The method of claim 34, wherein the photonic crystal fiber is a Bragg fiber.

36. An apparatus for monitoring a photonic crystal fiber, the apparatus comprising:

a mount for supporting the photonic crystal fiber;

an illumination system which during operation directs test light to a side of the photonic crystal fiber, wherein the test light is related to a estimated bandgap of the photonic crystal fiber;

a detection system which during operation detects measurement light emerging from the photonic crystal fiber in response to the test light; and a controller which during operation causes the illumination system to direct the test light, receives information based on the measurement light detected by the detection system, and determines a deviation between an actual bandgap for the photonic crystal fiber and the estimated bandgap based on the information.

37. The apparatus of claim 36, wherein during operation the controller determines a measurement light spectrum from the information.

38. The apparatus of claim 36, further comprising a fiber drawing system which during operation draws a photonic crystal fiber preform into the photonic crystal fiber.

39. The apparatus of claim 38, wherein during operation the controller adjusts a draw parameter of the fiber drawing system based on the deviation.

40. The apparatus of claim 36, wherein further comprising identifying compositional defects or structural defect in the photonic crystal fiber based on the deviation.

41. The apparatus of claim 40, further comprising a fiber drawing system which during operation draws a photonic crystal fiber preform into the photonic crystal fiber.

42. The apparatus of claim 41, wherein during operation the controller adjusts a draw parameter of the fiber drawing system based on the deviation.

43. A method for monitoring a photonic crystal fiber, the method comprising:

directing test light toward a side of the photonic crystal fiber while drawing the photonic crystal fiber from a photonic crystal fiber preform;

detecting measurement light emerging from the photonic crystal fiber in response to the test light; and monitoring optical properties of the photonic crystal fiber based on a estimated bandgap of the photonic crystal fiber and the measurement light.

44. The method of claim 43, wherein monitoring optical properties of the photonic crystal fiber comprises detecting defects in the photonic crystal fiber.

45. The method of claim 43, wherein the test light is related to the estimated bandgap and the optical properties are monitored based on a deviation of an actual bandgap determined from the measurement light and the estimated bandgap.

46. A method comprising:

directing test light towards a side of a photonic crystal fiber, wherein the test light is related to a estimated bandgap of the photonic crystal fiber;

detecting measurement light emerging from the photonic crystal fiber in response to the test light; and identifying a defect in the photonic crystal fiber based on the measurement light, wherein the defect causes a deviation between an actual bandgap for the photonic and the estimated bandgap.

47. The method of claim 46, wherein the photonic crystal fiber comprises a confinement region forming a two-dimensional photonic crystal.

48. The method of claim 46, wherein the photonic crystal fiber is a Bragg fiber.

* * * * *

UNITED STATES PATENT AND TRADEMARK OFFICE
CERTIFICATE OF CORRECTION

PATENT NO.    : 6,816,243 B2
DATED         : November 9, 2004
INVENTOR(S)   : Max Shurgalin et al.

It is certified that error appears in the above-identified patent and that said Letters Patent is hereby corrected as shown below:

Column 15,
Line 26, replace "a" with -- an --

Column 16,
Line 11, replace "differences" with -- difference --

Column 17,
Line 10, replace "a" with -- an --
Line 31, replace "defect" with -- defects --

Column 18,
Line 23, replace "a" with -- an --

Signed and Sealed this

Twenty-fourth Day of May, 2005

JON W. DUDAS
*Director of the United States Patent and Trademark Office*